(12) United States Patent
Helms

(10) Patent No.: US 6,581,587 B1
(45) Date of Patent: Jun. 24, 2003

(54) APPARATUS FOR OPENING GRILL COVER

(76) Inventor: James H. Helms, 5770 Hopewell Rd., Arab, AL (US) 35016

( * ) Notice: Subject to any disclaimer, the term of this patent is extended or adjusted under 35 U.S.C. 154(b) by 0 days.

(21) Appl. No.: 10/006,528

(22) Filed: Nov. 5, 2001

(51) Int. Cl.[7] ................................................ A47J 37/00
(52) U.S. Cl. .................... 126/25 R; 126/41 R; 126/192; 220/263; 110/178
(58) Field of Search ............................. 126/25 R, 41 R, 126/192, 200, 39 B, 222; 220/263, 262, 264, 908; 110/178; 49/357, 347, 379

(56) References Cited

U.S. PATENT DOCUMENTS

| | | | | |
|---|---|---|---|---|
| 2,124,349 A | * | 7/1938 | Herbster | 126/192 |
| 3,088,425 A | * | 5/1963 | La Rue | 110/178 |
| 5,903,120 A | * | 5/1999 | Shin | 220/263 |
| 5,918,588 A | | 7/1999 | Gil Garcia | |
| 5,931,083 A | | 8/1999 | Stanger et al. | |
| 6,026,736 A | | 2/2000 | Turner | |
| 6,209,744 B1 | * | 4/2001 | Gill | 220/264 |

* cited by examiner

Primary Examiner—James C. Yeung
(74) Attorney, Agent, or Firm—Lanier Ford Shaver & Payne P.C.

(57) ABSTRACT

An apparatus for opening an outdoor grill cover using an activation device and an opening mechanism. The activation device is attached to one end of the opening mechanism, and the activation device is positioned such that a grill user can access it. The opening mechanism is attached to the grill cover at an opposing end such that the activation device actuates the opening of the grill cover. The apparatus further includes a closing mechanism coupled to the opening mechanism such that the closing mechanism allows for gentle closure of the grill cover.

12 Claims, 3 Drawing Sheets

APPARATUS FOR OPENING GRILL COVER

BACKGROUND OF INVENTION

1. Field of the Invention

The present invention relates generally to stoves and furnaces, and particularly to outdoor grills with grill cover opening mechanisms.

2. Technical Background

Outdoor grills are typically designed with a handle affixed to the front of a grill cover. In the course of food preparation, it is necessary to manually lift the grill cover in order to gauge the progress of the food preparation. On conventional grills, the grill cover opens upward and away from the person lifting the cover. The Cover is inevitably placed in a resting position, leaning behind and away from the grill frame.

The typical design and placement of the grill cover handle may cause one using the grill to be exposed to injury. A user typically grabs the grill cover handle, grasping it from the closed position until the cover reaches its resting position. As such, the user's arm is momentarily directly above the heat emanating from the heating element used in the grill. In addition, many grill covers are designed such that a user's arm can inadvertently contact the grill cover while the cover is being lifted or closed.

SUMMARY OF THE INVENTION

Generally, the present invention provides an apparatus that allows one who is preparing food on a grill to open the grill cover in a manner eliminating the possibility of injury.

The apparatus of the present invention is an outdoor grill having an actuation device disposed on the grill frame. The apparatus for opening the cover of the outdoor grill further includes an opening mechanism mounted in the grill frame. The opening mechanism is attached at one end to the activation device, and the opening mechanism is attached at a second end to the grill cover. The opening mechanism is designed and configured such that when the activation device is depressed, the grill cover is opened and is left resting in an open position. Further, the apparatus of the present invention is designed to allow gentle closure of the grill cover.

The opening mechanism of the apparatus of the present invention can be designed to include an activation device that is a foot pedal. A force member is attached at one end to the foot pedal. The opposing end of the opening mechanism is attached to an intermediate push/pull linkage that is attached at its opposing end to a rocker arm. The rocker arm is interposed between the intermediate push/pull linkage and a second push/pull linkage that is attached to the grill cover. In addition to being attached to the second push/pull linkage, the rocker arm is attached to a hydraulic cylinder. When the foot pedal is depressed, the force member causes the intermediate push/pull linkage to create divergent force in the second push/pull linkage through the rocker arm. The divergent force creates a downward force in the second push/pull linkage causing the grill cover to open. The divergent force further causes compression of the hydraulic cylinder. When the foot pedal is released, the hydraulic cylinder provides a prohibitive force allowing the grill cover to close gently.

An opening mechanism of the present invention can include a tension spring attached to the rocker arm. The tension spring is compressed and the grill cover is opened when the foot pedal is depressed. The tension spring is positioned such that when the foot pedal is released, the tension spring provides a prohibitive force allowing the grill cover to close gently.

An opening mechanism of the present invention can include a pulley system. The force member is attached at one end to the foot pedal. A second end of the force member is attached to a cable that is coupled to a dual pulley. When the foot pedal is depressed, the dual pulley rotates causing a second cable to rotate a second pulley. The cable of the second pulley is attached to the grill cover, such that when the second pulley rotates, a downward force is created causing the grill cover to open. A tension spring is attached to an opposing end of the force member. When the foot pedal is depressed to open the grill cover, the tension spring is compressed. The tension spring then provides prohibitive force, allowing the grill cover to be closed gently.

DETAILED DESCRIPTION OF THE PREFERRED EMBODIMENTS

In general, the present invention provides an outdoor grill that includes a grill cover opening mechanism designed to allow the safe opening and closing of the grill cover. More specifically, the present invention provides a first preferred embodiment, which is an outdoor grill including a foot-actuated hydraulic opening mechanism. The opening mechanism opens the grill when a foot pedal is depressed. The present invention further provides a second preferred embodiment, which is an outdoor grill including a foot-actuated tension spring opening mechanism. The present invention also provides a third preferred embodiment, which is an outdoor grill including a foot-actuated pulley opening mechanism.

Figure 1:
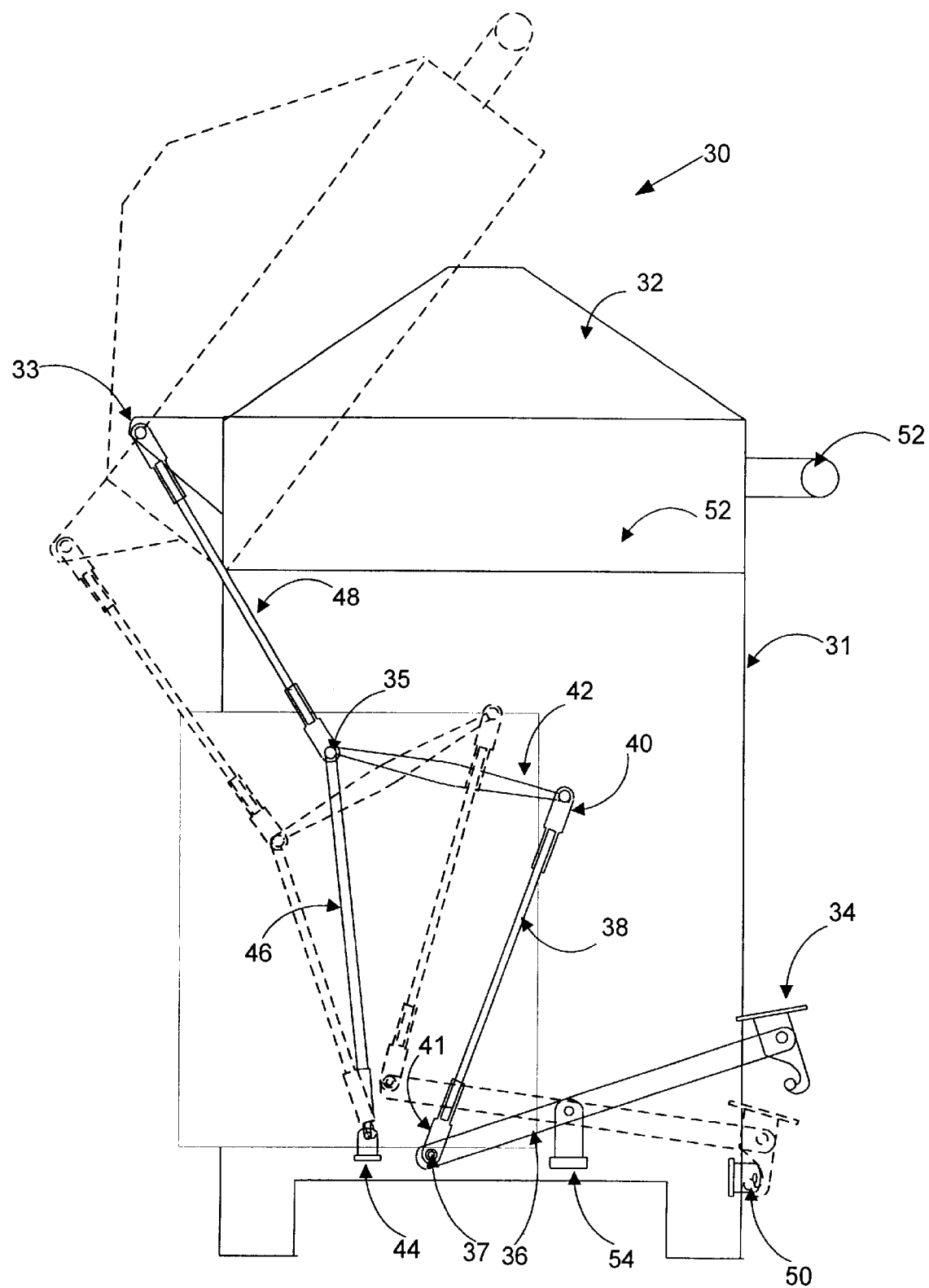
FIG. 1 is a side view of a cooking grill with an opening mechanism using a hydraulic cylinder, illustrating a first preferred embodiment of the present invention.

A first preferred embodiment of the present invention is described with reference to FIG. 1. FIG. 1 illustrates a side view of an outdoor grill having a foot-actuated hydraulic opening mechanism, and the first preferred embodiment is designated generally throughout as reference numeral 30.

The outdoor grill 30 includes generally a grill frame 31, a grill cover 32 situated on top of the grill frame 31, and a cover handle 52 attached to the grill cover 32. In addition, the outdoor grill 30 includes an opening mechanism attached to the grill cover 32 at pivot point 33. The opening mechanism is actuated by foot pedal 34.

The opening mechanism of the first preferred embodiment includes a force member 36 attached to the outdoor grill frame 31 by a rigid mounting mechanism 54. The foot pedal 34 is designed such that it is in a position accessible to a user's foot. Attached to the opposing end of the force member 36 at pivot point 37 is a push/pull linkage 38 that is attached to the rocker arm 42 at pivot point 40. The rocker arm 42 is further attached at pivot point 35 to a hydraulic cylinder 46 that is attached to the grill frame 31 by rigid mounting mechanism 44. A second push/pull linkage 48 is attached at pivot point 35 to the hydraulic cylinder 46 and rocker arm 42. The push/pull linkage 48 is further attached to the grill cover 32 at pivot point 33.

When the grill cover 32 is in a closed position, one operating the outdoor-grill 30 opens the grill cover 32 by placing a foot on the foot pedal 34 and depressing the pedal 34 until it is in a position such that it is attached to rigid mounting mechanism 50. When depressing the foot pedal 34, the force applied to the foot pedal 34 is held constant until the pedal is secured to the rigid mounting mechanism 50. The load applied to the foot pedal 34 results in a reverse force at the opposing end of the force member 36. The resultant force at pivot point 37 is distributed along the push/pull linkage 38, which is equipped with threaded yokes 40 and 41 for altering the position of the push/pull linkage 38. A divergent force is circulated about rocker arm 42, which compresses the hydraulic cylinder 46. At pivot point 35, the push/pull linkage 48, combined with the threaded yoke 40, lifts the cover 32 into its open position.

When closing the grill cover 32, the hydraulic cylinder 46 applies tension in the push/pull linkage 48. The applied tension allows the grill cover to be closed gently.

Figure 2:
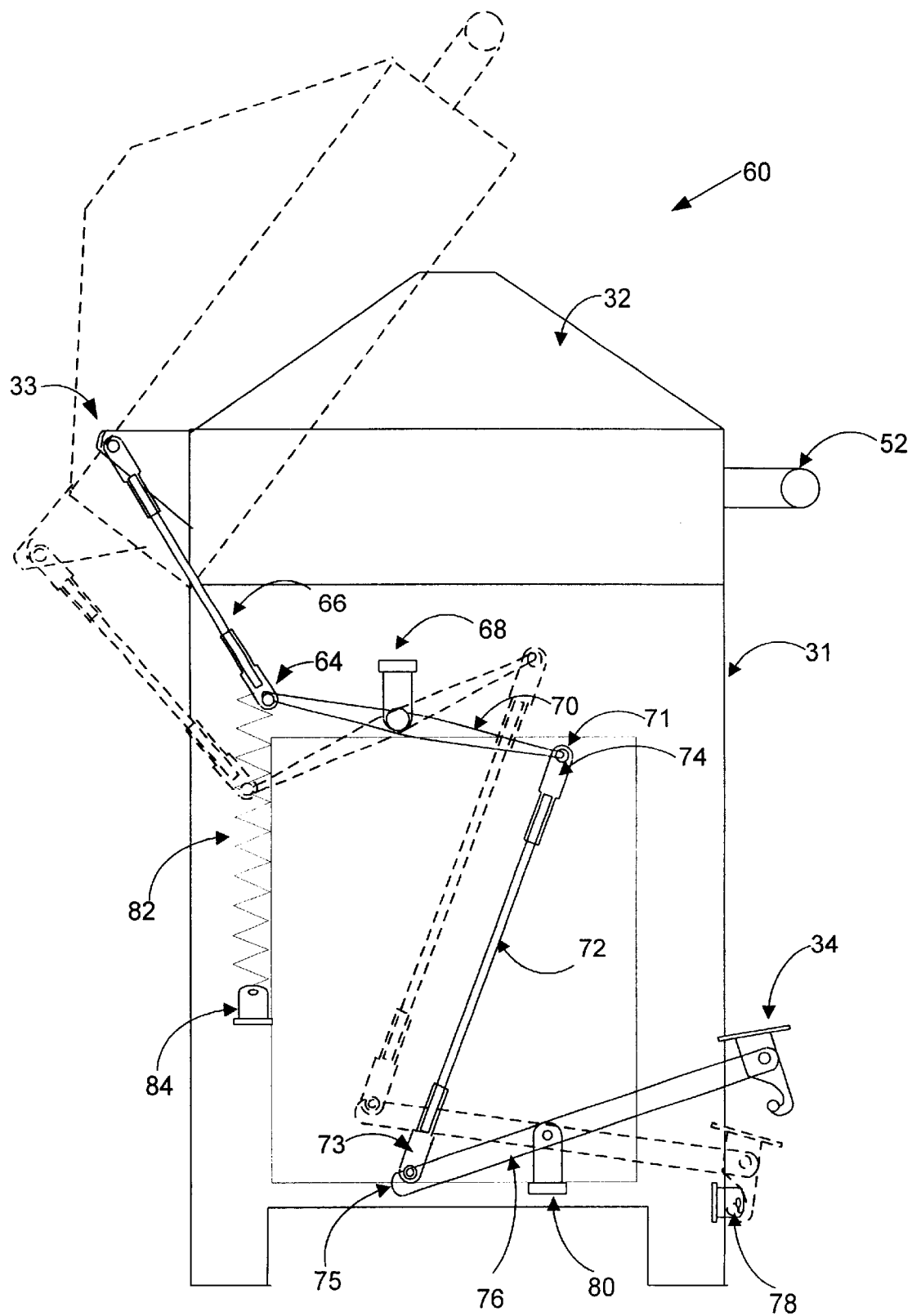
FIG. 2 is a side view of a cooking grill with an opening mechanism using a tension spring, illustrating a second preferred embodiment of the present invention.

A second preferred embodiment of the present invention is described with reference to FIG. 2. FIG. 2 illustrates a side view of an outdoor grill having a foot-actuated tension spring opening device, and a second preferred embodiment is designated generally throughout as reference numeral 60.

The outdoor grill 60 includes generally a grill frame 31, a grill cover 32 situated on top of the grill frame 31, and a manual cover handle 52 attached to the grill cover 32. In addition, the outdoor grill 60 includes an opening mechanism attached to the grill cover 32 at pivot point 33. The opening mechanism includes foot pedal 34 to activate the opening mechanism attached to the grill cover 32.

The opening mechanism of a second preferred embodiment includes a force member 76 attached to the outdoor grill frame 31 by a rigid mounting mechanism 80. The foot pedal 34 is designed such that it is in a position accessible to a user's foot. Attached to the opposing end of the force member 76 at pivot point 75 is a push/pull linkage 72 that is attached to the rocker arm 70 at pivot point 71. The rocker arm 70 is further attached at pivot point 64 to a tension spring 82 that is attached to the grill frame 31 by rigid mounting mechanism 84. A second push/pull linkage 66 is attached at pivot point 64 to the tension spring 82 and rocker arm 70. The push/pull linkage 66 is further attached to the grill cover 32 at pivot point 33.

When the grill cover 32 is in a closed position, one operating the outdoor-grill 60 opens the grill cover 32 by placing a foot on the foot pedal 34 and depressing the pedal 34 until it is in a position such that it is attached to rigid mounting mechanism 78. When depressing the foot pedal 34, the force applied to the foot pedal 34 is held constant until the pedal is secured to the rigid mounting mechanism 78. The load applied to the foot pedal 34 results in a reverse force at the opposing end of the force member 76. The resultant force at pivot point 75 is distributed along the push/pull linkage 72, which is equipped with threaded yokes 74 and 73 for altering the position of the push/pull linkage 72. A divergent force is circulated about rocker arm 70, which depresses the tension spring 82. At pivot point 64, the push/pull linkage 66, combined with the threaded yoke 74, lifts the cover 32 into its open position.

When closing the grill cover 32, the tension spring 82 applies tension in the push/pull linkage 66. The applied tension allows the grill cover to be closed gently.

Figure 3:
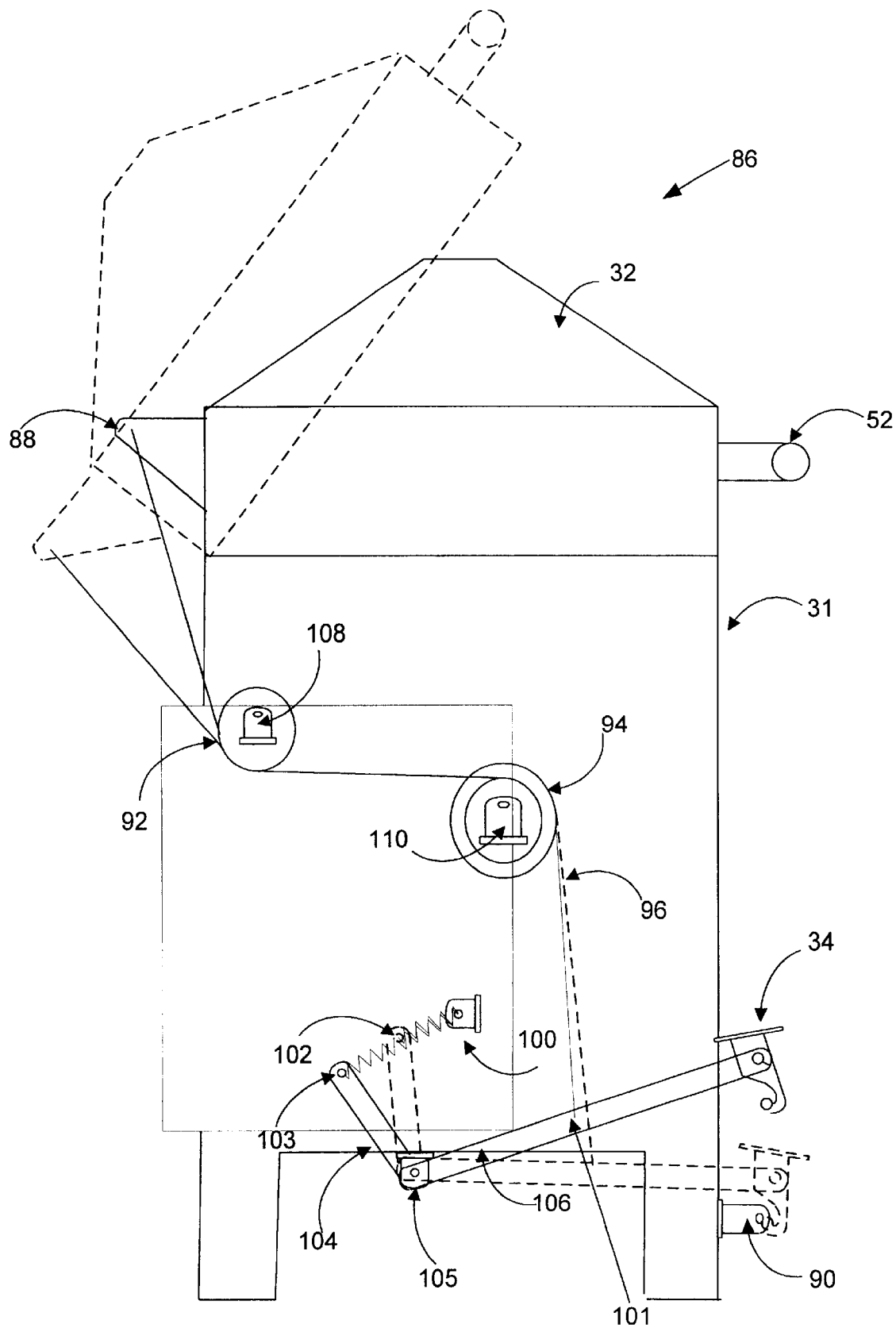
FIG. 3 is a side view of a cooking grill with an opening mechanism using a pulley system, illustrating a third preferred embodiment of the present invention.

A third preferred embodiment of the present invention is described with reference to FIG. 3. FIG. 3 illustrates a side view of an outdoor grill having a foot-actuated pulley opening mechanism, and a third preferred embodiment is designated generally throughout as reference numeral 86.

The outdoor grill 86 includes generally a grill frame 31, a grill cover 32 situated on top of the grill frame 31, and a manual cover handle 52 attached to the grill cover 32. In addition, the outdoor grill 86 includes an opening mechanism attached to the grill cover 32 at point 88. The opening mechanism includes foot pedal 34 to activate the opening mechanism.

The opening mechanism of a third preferred embodiment includes a force member 106 attached to the outdoor grill frame 31 by a rigid mounting mechanism 105. The foot pedal 34 is designed such that it is in a position accessible to a user's foot. Attached to the opposing end of the force member 106 at the mounting mechanism 105 is a force member 104 that is attached to a tension spring 102 at point 103. The tension spring is rigidly mounted to the grill frame 31 by a rigid mounting mechanism 100. A cable 96 is attached at position 101 to the force member 106. The cable is coupled to the dual pulley system 94 that is rigidly mounted to the grill frame 31 by rigid mounting mechanism 110. The cable 96 is then coupled to the pulley 92 that is rigidly mounted to the grill frame 31 by rigid mounting mechanism 108. The cable is attached at point 88 to the grill cover 32.

When the grill cover 32 is in a closed position, one operating the outdoor-grill 86 opens the grill cover 32 by placing a foot on the foot pedal 34 and depressing the pedal 34 until it is in a position such that it is attached to rigid mounting mechanism 90. When depressing the foot pedal 34, the force applied to the foot pedal 34 is held constant until the pedal is secured to the rigid mounting mechanism 90. The load applied to the foot pedal 34 results in a downward force at position 101 of the cable 96. As the force results in downward movement of the cable 96, the dual pulley 94 rotates clockwise. The clockwise rotation causes a downward force by pulley 108 of the cable 96 that results in a downward force at point 88. The downward force at point 88 causes the grill cover 32 to open.

When closing the grill cover 32, the tension spring 102 applies tension in the cable 96. The applied tension allows the grill cover to be shut gently.

It should be noted that the opening mechanisms as illustrated by the preferred embodiments are merely exemplary. The disclosure of the specific modes of opening the grill cover are not exclusive, and one of ordinary skill in the art will recognize other devices that may allow the opening and closing of a grill cover. Such devices may include hand-actuated hydraulic devices, hand-actuated pulley mechanisms, or hand-actuated tension spring opening mechanisms. In addition, other types of mechanical configurations that cause the opening of a grill cover fall within the ambit of the present invention.

What is claimed:
1. An outdoor grill, comprising:
an activation device;
an opening mechanism mounted to a grill frame, said opening mechanism attached to said activation device at a first end and attached to a grill cover at an opposing end such that when the activation device is activated, the grill cover rests in an open position;
a locking member, wherein said activation device is suitable for engaging said locking member such that said grill cover can be maintained in said open position without continuous activation of said activation device; and a closing mechanism coupled to said opening mechanism facilitating the closing of said grill cover.

2. An outdoor grill as claimed in claim 1, wherein said activation device is a foot pedal.

3. An apparatus as claimed in claim 2 wherein said opening mechanism comprises:
- a force member having a first end and an opposing end, said force member mounted to said grill frame and attached to said foot pedal on said first end;
- an intermediate push/pull linkage attached to said opposing end of said force member;
- an activating push/pull linkage attached to the grill cover;
- a rocker arm interposed between said intermediate push/pull linkage and said activating push/pull linkage, said activating push/pull linkage attached to said rocker arm at a pivot point;
- a hydraulic cylinder attached to said rocker arm at said pivot point wherein force applied to said foot pedal causes resultant movement in said force member, said intermediate push/pull linkage, and said rocker arm such that said hydraulic cylinder is compressed, causing downward force on said activation push/pull linkage, thereby opening said grill cover.

4. An apparatus as claimed in claim 2 wherein said opening mechanism comprises:
- a force member having a first end and an opposing end, said force member mounted to said grill frame and attached to said foot pedal on said first end;
- an intermediate push/pull linkage attached to said opposing end of said force member;
- an activating push/pull linkage attached to the grill cover;
- a rocker arm interposed between said intermediate push/pull linkage and said activating push/pull linkage, said activating push/pull linkage attached to said rocker arm at a pivot point;
- a tension spring attached to said rocker arm at said pivot point wherein force applied to said foot pedal causes resultant movement in said force member, said intermediate push/pull linkage, and said rocker arm, causing a downward force on said activation push/pull linkage, thereby opening said grill cover.

5. An apparatus as claimed in claim 4 wherein said tension spring is depressed by the downward force of said activation push/pull linkage thereby providing prohibitive tension when said foot pedal is released to close said grill cover.

6. An outdoor grill as claimed in claim 2, wherein said opening mechanism comprises:
- a force member having a first end and an opposing end, said force member mounted to said grill frame and attached to said foot pedal on said first end;
- a pulley system including a cable attached to said force member and attached to said grill cover such that when said foot pedal is depressed a resultant force opens said grill cover.

7. An outdoor grill as claimed in claim 6, said outdoor grill further including a tension spring attached to said opposing end of said force member such that when said foot pedal is depressed the tension spring is compressed, thereby providing prohibitive tension when said foot pedal is released to close said grill cover.

8. An outdoor grill, comprising:
- a grill frame;
- a locking member;
- a grill cover attached to said grill frame;
- a pedal positioned on said grill frame;
- an opening means intermediate said pedal and said grill cover, said opening means activated by depression of said pedal, causing the opening of said grill cover; and
- wherein said pedal is suitable for engaging said locking member such that said grill cover can be maintained in an open position without continuous activation of said pedal.

9. An outdoor grill as claimed in claim 8 wherein said opening means is a pulley system designed to open said grill cover when said pedal is activated.

10. An outdoor grill as claimed in claim 9 wherein said pulley system includes a tension spring designed such that when the pedal is depressed for opening said grill cover, said tension spring is compressed when the pedal is depressed, providing prohibitive tension when said pedal is released to close said grill cover.

11. An outdoor grill as claimed in claim 8 wherein said opening means is a linkage system, said linkage system including a hydraulic cylinder affixed to said linkage system such that when said pedal is depressed, said hydraulic cylinder is compressed, and when said pedal is released, said hydraulic cylinder provides a prohibitive force for closing said grill cover.

12. An outdoor grill as claimed in claim 8 wherein said opening means is a linkage system, said linkage system including a tension spring affixed to said linkage system, such that when said pedal is depressed, said tension spring is compressed and when said pedal is released, said tension spring provides a prohibitive force when closing said grill cover.

* * * * *